United States Patent [19]

Maehara et al.

[11] Patent Number: 5,250,775
[45] Date of Patent: Oct. 5, 1993

[54] ELECTRIC COOKING APPARATUS ADAPTED FOR GENERATING HIGH POWER OUTPUT CONTAINING A BATTERY

[75] Inventors: Naoyoshi Maehara; Daisuke Bessyo, both of Nara; Yuji Nakabayashi; Makoto Shibuya, both of Yamatokoriyama; Takahiro Matsumoto, Nara; Shigeru Kusunoki; Susumu Kiritoshi, both of Yamatokoriyama, all of Japan

[73] Assignee: Matsushita Electric Industrial Co., Ltd., Kadoma, Japan

[21] Appl. No.: 849,976

[22] Filed: Mar. 12, 1992

[30] Foreign Application Priority Data

Mar. 20, 1991 [JP] Japan .................... 3-056590
Mar. 20, 1991 [JP] Japan .................... 3-056630

[51] Int. Cl.$^5$ .............................. H05B 6/68
[52] U.S. Cl. .......................... 219/10.55 B; 219/482; 307/43; 307/72
[58] Field of Search ............ 219/10.55 B, 10.55 R, 219/482, 488; 363/21, 49; 307/43, 72, 75, 80, 81, 56

[56] References Cited

U.S. PATENT DOCUMENTS

| 4,312,078 | 2/1982 | Mack et al. | 219/386 |
| 4,667,075 | 5/1987 | Sakurai | 219/10.55 B |
| 4,697,424 | 10/1987 | Dickerson et al. | 219/10.55 R |
| 4,904,837 | 2/1990 | Low et al. | 219/10.55 B |
| 4,977,301 | 12/1990 | Maehara et al. | 219/10.55 B |

FOREIGN PATENT DOCUMENTS

| 0493623 | 7/1992 | European Pat. Off. |
| 58-072368 | 4/1983 | Japan . |
| 1-305233 | 12/1989 | Japan . |
| 2-132587 | 5/1990 | Japan . |
| 2-230688 | 9/1990 | Japan . |
| 678558 | 8/1979 | U.S.S.R. |
| 788234 | 12/1980 | U.S.S.R. |
| 907699 | 2/1982 | U.S.S.R. |

*Primary Examiner*—Philip H. Leung
*Attorney, Agent, or Firm*—Spencer, Frank & Schneider

[57] ABSTRACT

An electric cooking apparatus includes a single power converter section for converting power supplied from an external AC power source. A heating-energy radiator section receives the converted power from the power converter section and radiates heating energy to a heating chamber. A battery is also provided for supplying power to the power converter section such that a sum of the power from the external AC power source and the battery is converted by the power converting section when an instantaneous voltage of the external AC power source is smaller than a predetermined voltage level, which predetermined voltage level is smaller than a maximum instantaneous voltage of the external AC power source.

11 Claims, 11 Drawing Sheets

ELECTRIC COOKING APPARATUS ADAPTED FOR GENERATING HIGH POWER OUTPUT CONTAINING A BATTERY

BACKGROUND OF THE INVENTION

1. Field of the Invention

The present invention relates to an electric cooking apparatus such as an electric range or an electric oven.

2. Description of the Related Art

Figure 12:
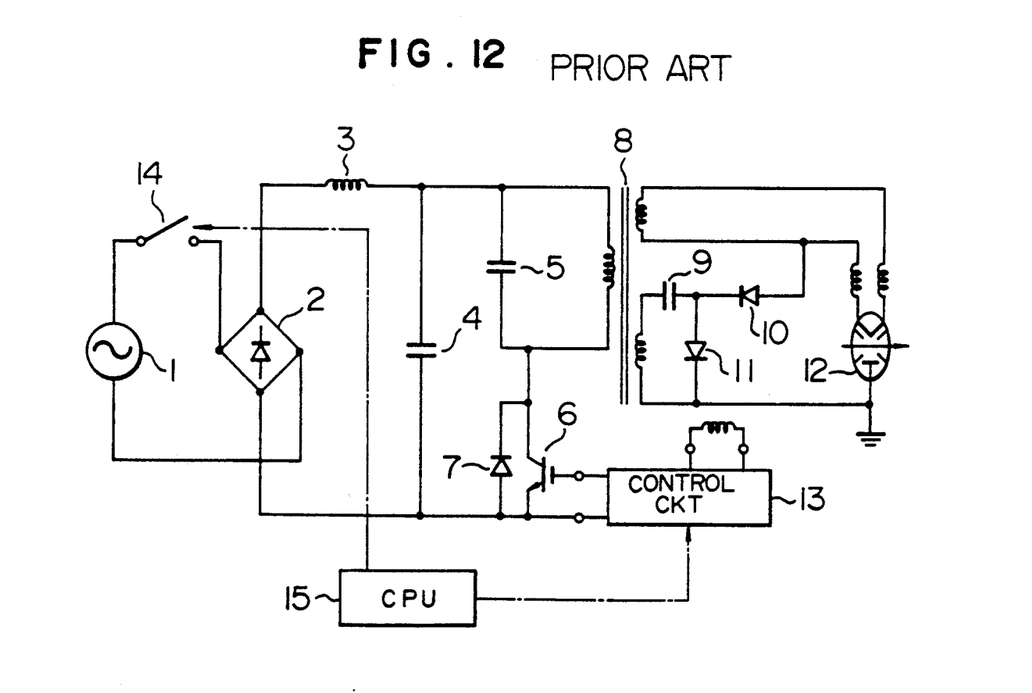
FIG. 12 is a circuit diagram of the prior art high frequency heating apparatus.

The conventional high frequency heating apparatus, as shown in FIG. 12, is composed of a rectifier circuit comprising a rectifier 2 for rectifying electric power supplied from a commercial power source 1, an inductor 3 and a capacitor 4; an inverter circuit comprising a capacitor 5, a transistor 6, a diode 7 and a boosting transformer 8; a high voltage rectifying circuit comprising a high voltage capacitor 9 and high voltage diodes 10 and 11; a magnetron 12 for generating a high frequency radio wave in response to the output from the high voltage rectifying circuit; a control circuit 13 for controlling the operating frequency of the transistor 6; and heating control section 15 for controlling a relay 14 and issuing a heating command to the control circuit 13.

Figure 13:
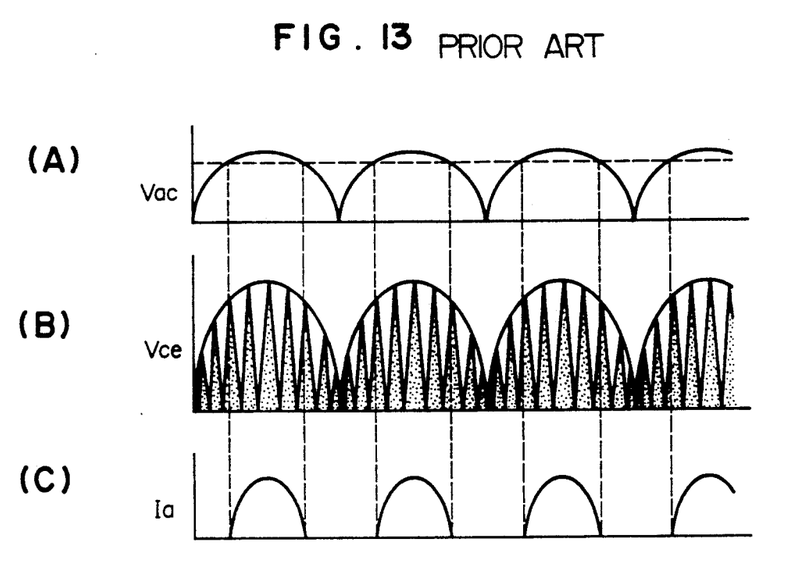
FIG. 13 shows a waveform diagram wherein (A) shows a diagram of the input voltage in FIG. 12, (B) shows a diagram of the voltage across the transistor and its envelope in FIG. 12, and (C) shows a diagram of the envelope of the anode current of the magnetron in FIG. 12.

FIGS. 13(A), (B) and (C) show a terminal voltage Vac across the capacitor 4 which is an input voltage to the inverter circuit, a collector-emitter voltage Vce of the transistor 6 and its envelope, and the envelope of the anode current Ia of the magnetron, respectively. The actual Ia waveform has the envelope as shown and the high frequency ripple similar to Vce. As indicated by broken lines, the magnetron 12 oscillates only during the period while Ia flows and Vce exceeds the voltage corresponding to threshold voltage of the magnetron 12. Specifically, in order to prevent reduction in the input power factor at the input terminal (i.e., an AC terminal of the rectifier 2) of a high frequency heating apparatus, the terminal across the capacitor 4 is obliged to have the voltage waveform as shown in FIG. 13(A). Thus, the magnetron 12 will perform an intermittent operation as shown in FIG. 13(C). On the other hand, the transistor 6 operates also during the period while Ia does not flow. This period does not almost contribute to the high frequency oscillation of the magnetron 12. This means that the transistor 6 operates wastefully.

The commercial power outlet in general homes is usually rated at 15A, and the indoor power wiring in the homes is also usually rated at 20A. For this reason, the maximum consuming current of the high frequency heating apparatus such as an electric range must be set for 13–14 A. This is because although the indoor wiring current capacity is 20 A, equipments such as a rice cooker and a toaster which are used simultaneously with the high frequency heating apparatus have usually the consuming current of 6–7 A.

Thus, in the conventional high frequency heating apparatus, as shown in FIG. 13(C), the oscillation period of the magnetron 12 is about ½ of the entire operation period, and also the input current is limited by the commercial power source. Hence, the instrument rated at e.g., AC 100 V usually has the input power limited to 1.3–1.4 kW. As a result, the high frequency output of the conventional heating apparatus is usually limited to at most about 600 W. The permissible maximum output rating for a short time is 700 W, and only the high frequency heating apparatus with such a radio wave has been put into practice.

Figure 14:
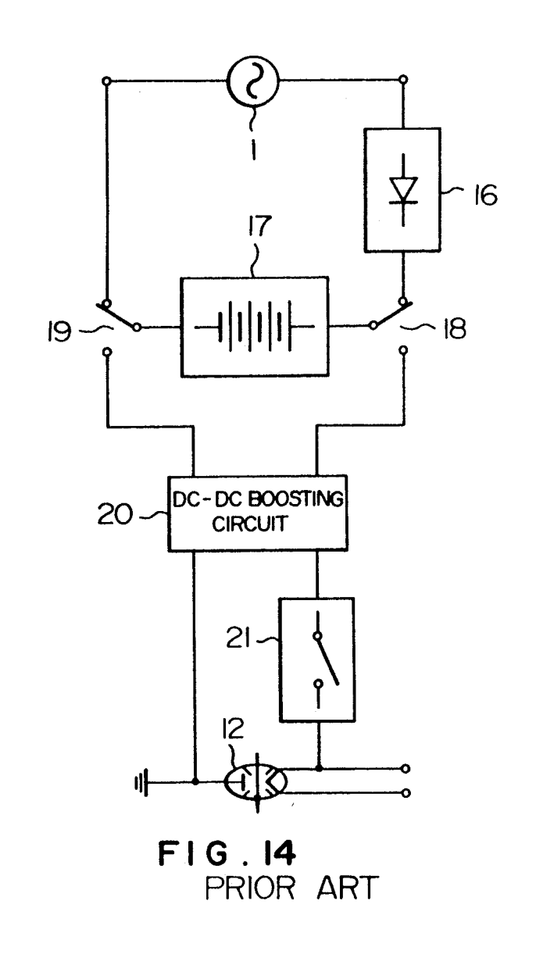
FIG. 14 is a block diagram of the other prior art high frequency heating apparatus.

Japanese Patent Publication No. 56- 21237 discloses the high frequency heating apparatus as shown in FIG. 14. In this high frequency heating apparatus, the AC voltage from a commercial power source 1 is rectified by a rectifier 16 to be converted into a DC voltage, and also a battery 17 is provided to supply the voltage to a DC—DC boosting circuit 20 using switches 18 and 19. Thus, electric power is supplied to a magnetron 12 through an interrupting circuit 21. This high frequency heating apparatus intends to provide radio wave output of 600 W (an input of 1200 W) to homes with small contract electric power. This is realized in such a way that energy is stored in the battery 17 with about 100 V while the apparatus is not used, and when the apparatus is used, the stored energy is taken out to drive the magnetron 12.

Although the above prior art wa directed to the electric range, it is also applied to a cooker using a heater such as an electric oven. In short, in the prior art, because of limitation due to the maximum consuming current from the commercial power source, the power source of 100 V permitted the cooking apparatus to be put into practice only with input power of 1.4 kW or less.

As described above, the prior art can only provide the radio wave output limited by the input current from a commercial power source; it is difficult to promote the feature of high speed heating (cooking) of the high frequency heating apparatus. Further, since the conventional arrangement of FIG. 14 provided with a battery must have capability of storing very large energy, the apparatus has disadvantages that it is large-scaled and expensive, and also requires to switch the output from the high-voltage large electric power battery. It can be also assumed that both the DC voltage from the rectifier (half-wave rectifier) 16 and the output voltage from the battery 17 are simultaneously supplied to the DC—DC boosting circuit 20. However, only taking out both voltages gives rise to inconveniences including considerable reduction in the input power factor in the commercial power source 1 and occurrence of an unstable operation due to mis-matching of internal impedances of both power sources. Thus, this cannot be actually realized. As a result, the arrangement of FIG. 14 also suffers from the limitation due to the input current from the external power source such as a commercial power source, and so cannot solve the problem that the AC input voltage of e.g. 100 V limits the radio wave output to about 600 W–700 W.

Accordingly, it is very difficult to provide a high frequency heating apparatus or cooking cooker such as an electric oven which can realize high speed heating (cooking) with a large high-frequency output not limited by the current capacity of the external power source and also has a compact and light-weight structure. A cooking apparatus suited to modern food life requiring high speed cooking has been demanded.

SUMMARY OF THE INVENTION

The present invention intends to solve the above problems of the prior arts described above.

An object of the present invention is to provide a high frequency heating apparatus which can be easily fabricated so as to avoid large-scaling, complicating and high cost, greatly promote its feature of providing a large high frequency output not limited by the input current from an external power source such as a commercial power source, and provide high power factor and high reliability to attain high safety.

Another object of the present invention is to provide a cooking apparatus such as an electric oven which has the same feature as the above high frequency heating apparatus and can provide a large heating output.

In order to achieve the above objects, in accordance with one aspect of the present invention, there is provided a cooking apparatus comprising a single power converter section for converting power supplied from an AC or DC external power source, a heating-energy radiator section for receiving the converted power from the power converter section and radiating heating energy such as radio wave or radiation heat to a heating chamber, and a battery, wherein the amount of power from the external power source and the amount of battery power are summed and power-converted by the power converter section to be supplied to the heating-energy radiator section.

In accordance with another aspect of the present invention, the heating- energy radiator section is constructed by radio wave radiating means, the power converter section is constructed by a single inverter circuit having one or more semiconductor devices, and also the amount of power from the external power source and the amount of the direct or modified output power from the battery are summed and power-converted by the inverter circuit to be supplied to the heating energy radiator section.

In accordance with still another aspect of the present invention, the power converter section is constructed by rectifier means for rectifying the power from the external AC power source into a uni-directional power, and the direct or modified output power from the battery is supplied to the rectifier means so that the amount of power from the external power source and the amount of the battery power are summed and taken.

In accordance with a further aspect of the present invention, voltage boosting means is provided to boost the output from the battery with a low voltage of 45 V or less, and the amount of power from the voltage boosting means and the amount of power from the external power source are summed and power-converted by the single power converter to be supplied to the heating energy radiation means.

In accordance with a further aspect of the present invention, charging means for charging the battery is provided.

In accordance with a further aspect of the present invention, the amount of power from the external power source and the amount of power from the battery are summed and power-converted by the single power converter for a predetermined time under control by a short-time high-output control section, and thus the power larger than the stationary maximum value of a continuously operable power is power-converted to be supplied to the heating energy radiation means.

In accordance with the arrangements described above, the single power converter section permits the cooking apparatus to be made using the power which is not limited by the power capacity of the external power source and is larger than the maximum value thereof. This realizes a very high speed cooking which could not be performed by the prior arts. Particularly, the single power converter section power-converts the sum of amounts of power so that the problems such as reduction in the power factor in the external power source and impedance mis-matching do not occur. Thus, a large heating energy due to the power-conversion of the sum of amounts of power can be generated in a simple structure.

Since the sum of amounts of power is supplied to the single inverter circuit, and the power converted by the inverter is supplied to the radio wave radiator means, a large radio wave is prevented from being instantaneously generated from the radio wave radiating means, and also radio wave cooking based on an average large radio wave output can be realized. Hence, high speed cooking based on the large radio wave, which could not be realized by the prior art, can be performed with no reduction of reliability.

Since the power from the external AC power source is converted into unidirectional power by the rectifier means, the amount of power of the battery and the amount of power from the external power source can be easily summed to be supplied to the heating energy radiation means.

Further, since the voltage boosting means is provided, the battery which exhibits excellent safety in the range lower than 45 V and is not expensive can be used, and summing the amounts power of the external power source and the battery can be easily done while it is adjusted very finely.

Since the charging means is provided to charge the battery through the external power source, the cooking apparatus with the battery which is automatically charged can be realized.

Since the short-time high-output control section is provided to perform the high-output cooking based on the summed power only for a predetermined time, using the output from the battery can be limited to only a necessary case. Thus, the output from the battery can be used very efficiently Also the cooling capability and heat-resisting performance of the cooking apparatus are not excessively enhanced but set to an appropriate degree. As a result, the entire apparatus is made compact and economical The above and other objects and features of the present invention will be more apparent from the following description taken in conjunction with the accompanying drawings.

DESCRIPTION OF THE PREFERRED EMBODIMENTS

Now referring to the drawings, an explanation will be given of several embodiments of the present invention.

Figure 1:
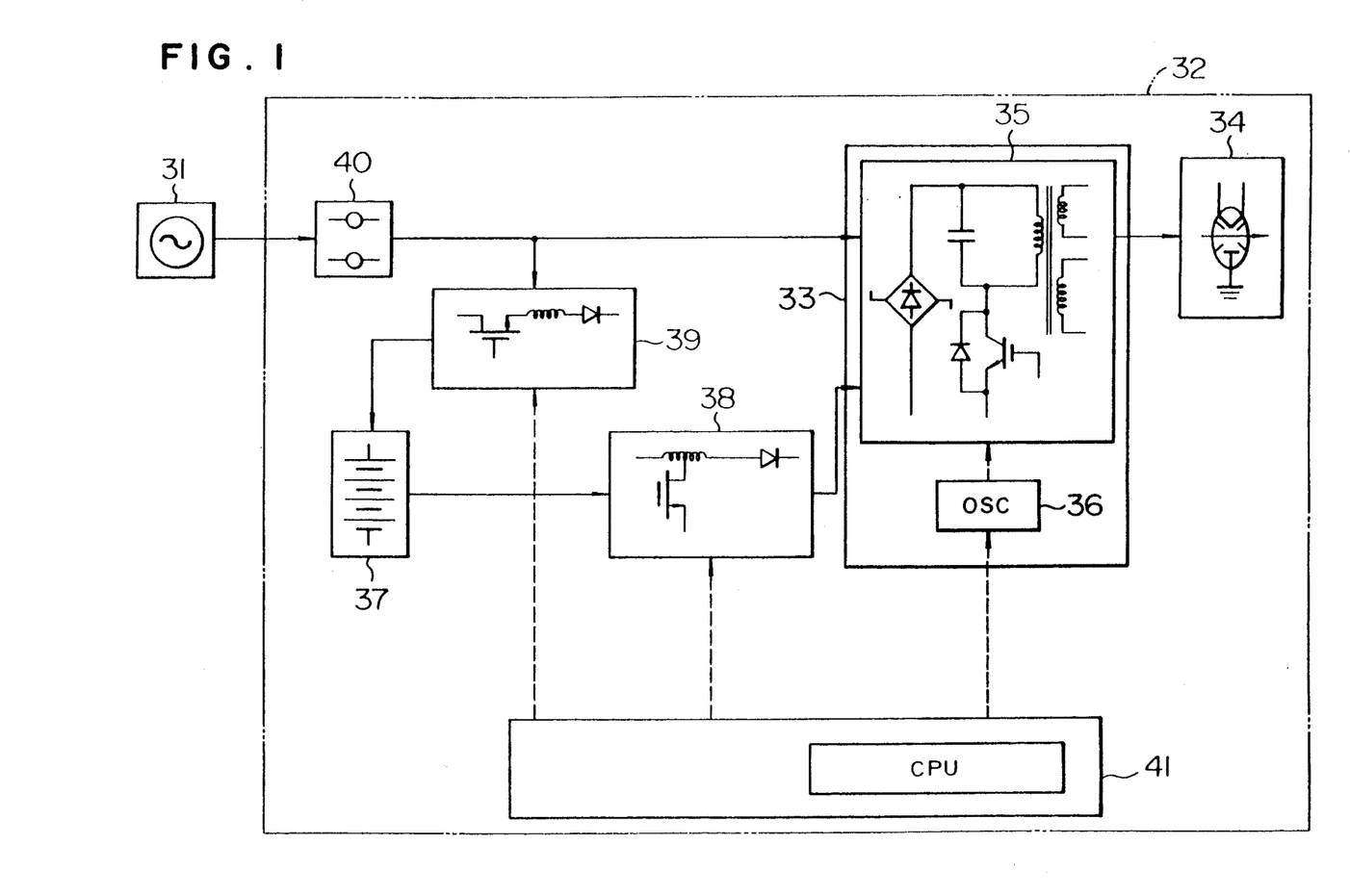
FIG. 1 is a block diagram of a high frequency heating apparatus (cooking apparatus) according to one embodiment of the present invention.

FIG. 1 shows the high frequency heating apparatus which is an example of a cooking apparatus according to one embodiment of the present invention.

In FIG. 1, 31 denotes an external power source such as a commercial power source, a generator and a battery which serves to externally supply power to a high frequency heating apparatus 32. The high frequency heating apparatus 32 comprises a power converter section 33 for converting the supplied power and a radio wave radiating section 34 for generating a high-frequency radio wave (e.g., microwave) in response to the power converted by the power converter 35 and supplying it to a heating chamber (not shown) as heating energy The power converter section 33 may be composed of a power converter 35 and a converter control unit 36. The high frequency heating apparatus 32 further comprises a battery 37 with an low output voltage of 45 V or less; the output from the battery 37 is supplied to the power converter 35 of the power converting section 33 through the voltage boosting section 38. There is no dangers such as electric shock or electric corrosion because the battery 37 provides a low voltage. Thus, the battery 37 may be located at any position. Namely, it may be incorporated in the housing of the high frequency heating apparatus, or may be attached to the exterior thereof so that it can be easily replaced with another battery. Charging means 39 can charge the battery 37 with the energy supplied from the external power source through an input section 40 so that the battery 37 can be used for a long time without being replaced. The high frequency heating apparatus 32 further comprises a heating control section 41. The heating control section 41 controls the converted power of the power converting section 33 by controlling e.g., the converter control unit 36 thereby to adjust the magnitude of the output radio wave from the radio wave radiating section 34. The heating control section 41 can also control the voltage boosting section 38 so that the power from the battery 37 in addition to that from the external power source 31 to the power converter section 33 are supplied to the power converter section 33. What is suitable as the battery 37, which is required to have a large output characteristic, is a lead battery, a Ni-Cd battery or Ni-H battery. In the case where such a kind of battery is used, the more appropriate voltage of the battery is 12 V-24 V in view of safety in voltage, reliability for electric contact or productivity in fabrication. For this reason, in this embodiment, the output from the battery 37 with an output of 24 V is boosted by the voltage boosting section 38 so that the output voltage from the battery 37 is adjusted to a desired value lower than the instantaneous maximum voltage of the external power source 31 (141 V if the external power source is a commercial 100 V source). This adjustment is made on the basis of the command signal from the heating control section 41 in harmony with the control of the power converter section 35. Particularly, in order that the high frequency heating apparatus 32 does not provide a low power factor for the external power source 31, the output voltage from the battery 37 is adjusted to the desired value lower than the instantaneous maximum voltage of the external power source 31.

Figure 2:
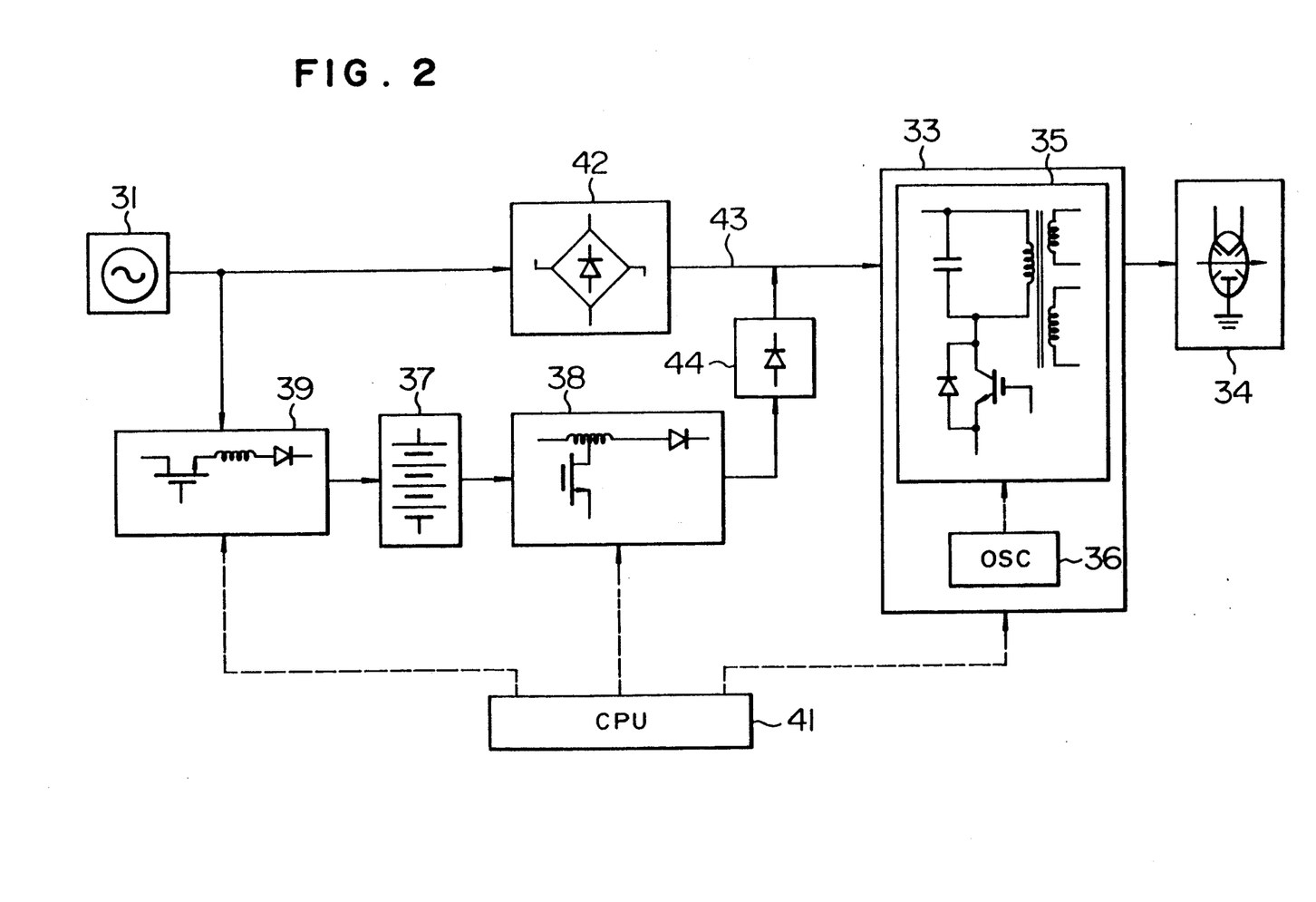
FIG. 2 is a block diagram of a high frequency heating apparatus according to another embodiment of the present invention.

FIG. 2 shows the high frequency heating apparatus according to another embodiment of the present invention. In FIG. 2, like reference numerals designate like parts in FIG. 1. In FIG. 2, on a supply line 43, the AC voltage from the commercial power source 31 is converted into a high ripple unidirectional voltage having a full-wave rectified waveform by a diode bridge 42. This unidirectional voltage is in turn supplied to the inverter circuit constituting the power converter 35. The output voltage from the battery 37 is supplied through a diode 44 to the supply line 43 as an output from the voltage boosting section 38.

Figure 3:
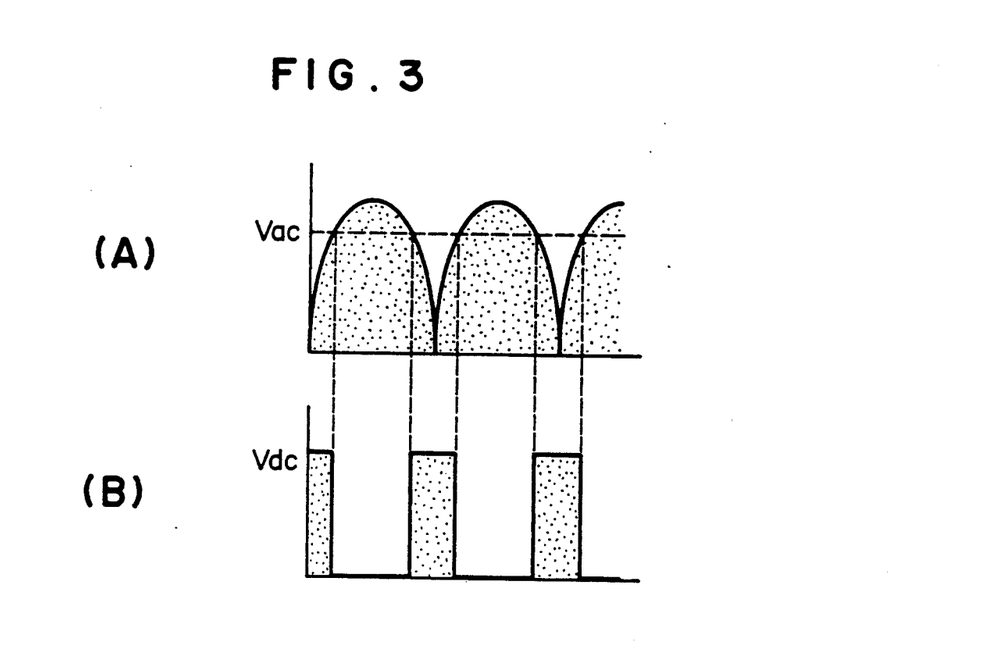
FIG. 3 is a waveform diagram, wherein (A) shows a diagram of the output voltage from the full-wave rectifying means in FIG. 2, and (B) shows a diagram of the output voltage from the voltage boosting section in FIG. 2.
Figure 4:
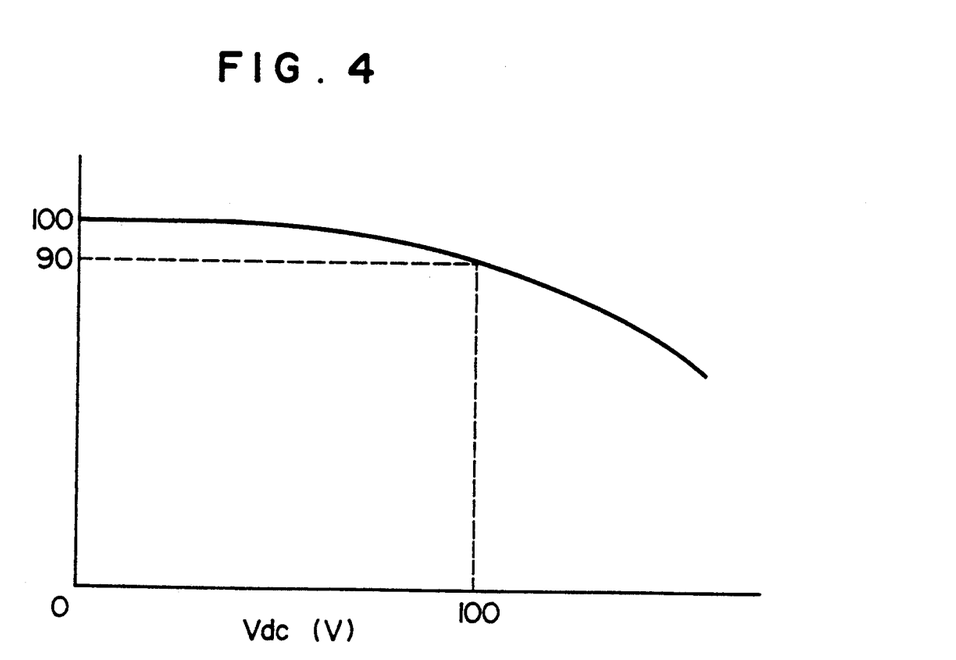
FIG. 4 is a graph showing the power factor characteristic of the input from a commercial power source versus the output voltage from the voltage boosting section in FIG. 2.

FIGS. 3(A) and (B) show individual waveforms Vac and Vdc of the output voltages from the diode bridge 42 and the diode 44. If the value of Vdc is changed, the AC input power factor will be changed. FIG. 4 shows an experimental result demonstrating such a characteristic. With the effective value of the input current from the commercial power source 31 of 100 Vac in FIG. 2 controlled to a constant value of 13.5 A, if the DC voltage Vdc supplied from the battery 37 is increased, the power factor starts to lower gradually at several tens of V. The power factor results in about 90% at about 100 V. If Vdc is further increased, the power factor abruptly lowers. This is because the power source impedance on the side of the battery 37 including the voltage boosting section 38 is necessarily lower than that of the commercial power source 31. Specifically, if Vac in FIG. 3(A) is not lower than the voltage (broken line) corresponding to Vdc in FIG. 3(B), power is supplied from the commercial power source 31; on the other hand, the former is lower than the latter, the power is supplied from the battery 37. Hence, the voltage supplied from the battery 37 to the power converter 35 has a square waveform with the peak voltage Vdc as shown in FIG. 3(B). In this case, even if the output from the voltage boosting section 38 is fixed to Vdc, the voltage supplied to the power converter 35 becomes as shown in FIG. 3(B). As a result, it is not necessary to control the output voltage in accordance with the instantaneous value of the commercial power source 31.

Figure 5:
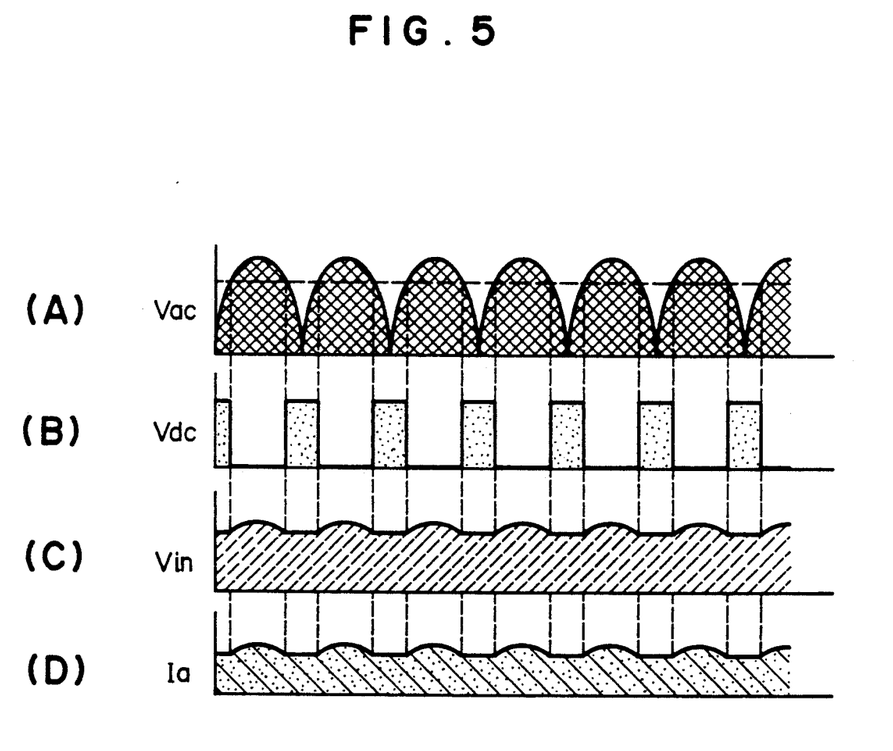
FIG. 5 shows a waveform diagram wherein (A) shows a diagram of the voltage supplied from the commercial power source through the full-wave rectifying means in FIG. 2, (B) shows a diagram of the voltage supplied from the voltage boosting section in FIG. 2, (C) shows a diagram of the sum of the voltages supplied from the commercial power source and the voltage boosting section in FIG. 2, and (D) shows a diagram of the envelope of the anode current of the magnetron in FIG. 2.

FIGS. 5(A), (B), (C) and (D) show the waveforms of Vac, Vdc, the summed voltage Vin (input voltage to the power converter 35) of Vac and Vdc, and the envelope of the anode current Ia from the magnetron which is the radio wave radiating section 34, respectively. As apparent from comparison with the prior art shown in FIG. 13, the envelope of Ia for Vac has a peak value equal to that in the prior art but has an average value increased greatly. Although not shown in FIG. 5, since Vin has the waveform as shown in FIG. 5(B), the voltage Vce applied to the transistor constituting the power converter 35 and others has the peak value equal to that in the prior art as a matter of course. Thus, no high withstand component is required. In this way, with no necessity of making the peak value of each of the anode current Ia of the magnetron and the transistor voltage Vce (and so the current) larger than that in the prior art and with small reduction in the power factor of the input from the external AC power source, the converted power in the power converter section 33 can be increased in a simple structure As a result, the output radio wave from the radio wave radiating section 34 can be increased sufficiently. Concretely, in the arrangement of FIG. 2, with the input power of about 1200 W and about 13.5 A from the commercial power source 31 and Vdc of about 105 V, the power of about 800 W is supplied from the battery 37 so that the power converter 35 can convert about 2000 W. As a result, the magnetron 34 can the radio wave of about 1000 W. This permits the cooking time to be largely shortened as compared with the prior art and prevents an inconvenience such as great reduction in the power factor. Accordingly, the above larger radio wave output can be produced while the input current is maintained at a desired value of 13–14 A or less.

Figure 6:
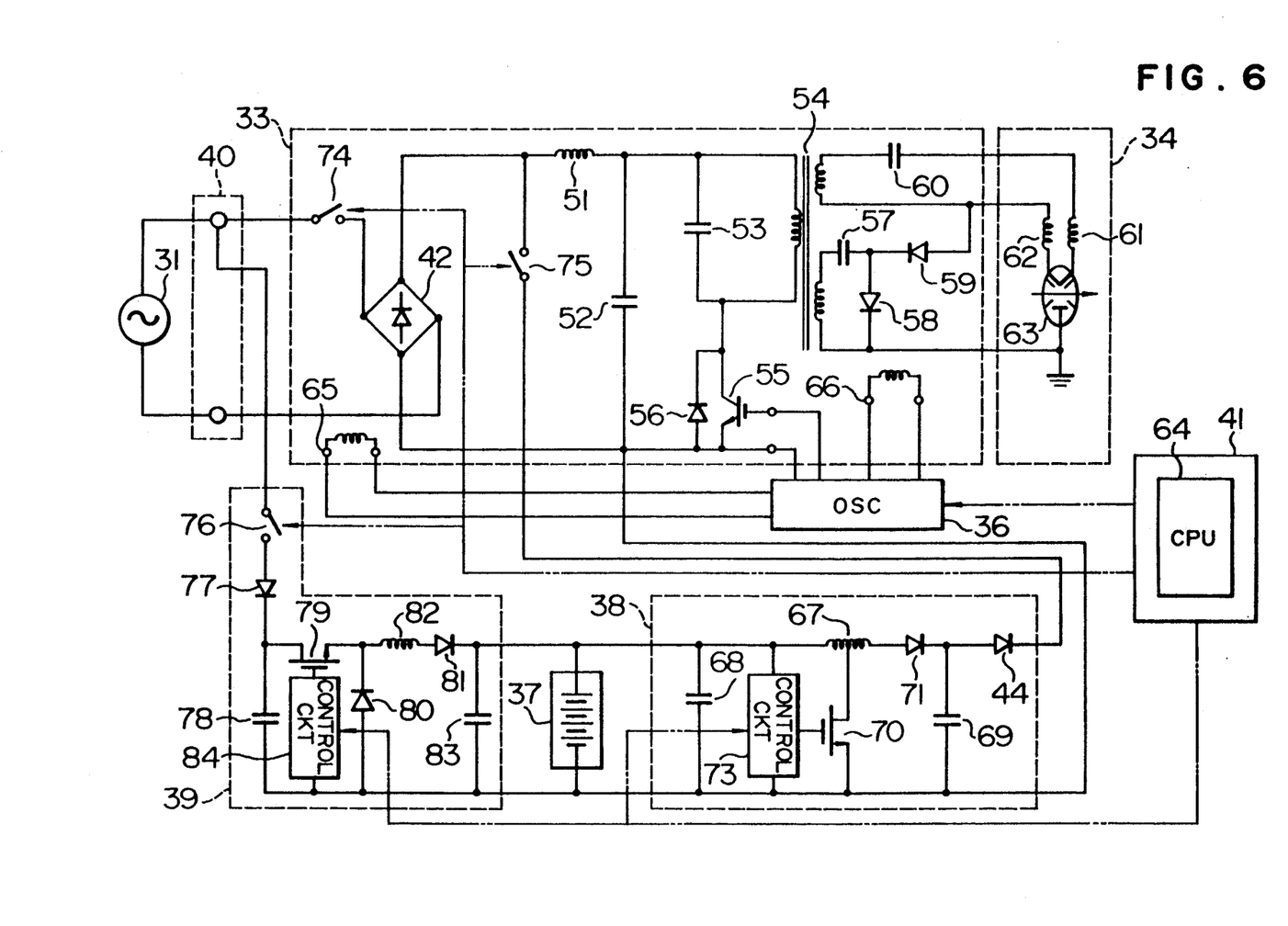
FIG. 6 is a detailed circuit diagram of the high frequency heating apparatus of FIG. 2.

FIG. 6 shows a further detailed circuit configuration for implementing the embodiment of FIG. 2. In FIG. 6, like reference numerals designate like elements in FIG. 2. Also in the arrangement of FIG. 6, a commercial power source 31 is used as an external power source.

In FIG. 6, a power converting section 33 comprises a DC power source composed of a diode bridge 42, an inductor 51 and a capacitor 52 and providing a full-wave rectified waveform; an inverter composed of a resonating capacitor 53, a voltage boosting transformer 54, a transistor 55 and a diode 56; a high voltage rectifying circuit composed of a capacitor 57 and diodes 58 and 59; and a heater circuit composed of a resonating capacitor 60 and inductors 61 and 62. A radio wave radiating section 34 comprises a magnetron 63. A converter control circuit 36 controls the switching frequency of the transistor 55 to operate the inverter, thereby supplying high voltage power and heater power to the magnetron 63. Then, the magnetron 63 oscillates to radiate a radio wave to a heating chamber The details of the basic power converting operation of the inverter are not explained since they are well known. On the basis of the signal from a heating control section 41 including a microcomputer 64, the converter control circuit 36 serves to stabilize the radio wave output due to the signals from current transformers 65 and 66 and also control the transistor 55 to adjust the magnitude of the radio wave output.

In view of safety and production cost, a battery 37 is desired to have low voltage electric power of 12 V–24 V. The power from the battery 37, therefore, is supplied to the power converter section 33 through a voltage boosting circuit or section 38. The voltage boosting circuit 38 is a 'voltage boosting type DC/DC converter' composed of a voltage boosting inductor 67 equipped with a tap, capacitors 68, 69, a transistor 70, diodes 71, 44 and a control circuit 73. Although the operation of the circuit 38 will not be explained in detail, it should be noted that the control circuit can control the on/off ratio of the transistor 70 to adjust the terminal voltage (i.e., DC output voltage) across the capacitor 69.

During the heating operation by the high frequency heating apparatus, the heating control section 41 closes relay contacts 74 and 75, and gives an operation command to the converter control circuit 36 and the control circuit 73 of the voltage boosting circuit 38. Thus, the inverter which is a main part of the power converting function of the power converter section 33 receives, for its power converting operation, the sum of the power from the commercial power source 31 and the power from the battery 37 which has been boosted by the voltage boosting circuit 38.

The arrangements explained hitherto can realize the power converting operation and high-frequency heating operation described with reference to FIGS. 2 to 5. Such arrangements have merits of increasing the average value without enhancing the maximum value which are also very preferable for the semiconductors such as the transistor 53 and the resonating capacitor 33 in the power converter section 33. Thus, the arrangements permits the power conversion about twice as large as the prior art using relatively low-price components. Further, the arrangement supplying Vdc only when the instantaneous voltage of the commercial power source 31 is low can easily maintain the power factor of the input from the commercial power source 41 at a relatively high value and also superpose Vdc on the voltage Vac from the commercial power source 31. As a result, under such high output control, the high frequency heating apparatus with a high power factor of the input power can be provided.

Additionally, as shown in FIG. 5(B), the operation of the voltage boosting circuit 38 may be interrupted in synchronism with the instantaneous value of Vac. However, if the capacitance of the smoothing capacitor 69 is set to give a discharging time constant much larger than the period of the commercial power source, the voltage boosting circuit 38 can provide the same performance by its continuous operation without necessitating the interruption operation. Specifically, Vdc may be fixed to e.g, 105 V as described above In this case, the voltage boosting circuit 38 has only to operate to provide an average DC output of 105 V regardless of the instantaneous value of the commercial power source. Thus, although the capacitor must have a large capacitance, the voltage boosting circuit 38 has only to perform the average operation (e.g., the operation at a substantially constant frequency) and so can be controlled relatively easily Further, the elements such as the transistor 70 have only to deal with the average power so that the maximum current and maximum voltage can be restrained to lower values In the case where the power supplied from the battery 37 is high, the above arrangement of the voltage boosting circuit 38 is more preferable from the viewpoints of cost and conversion efficiency.

When the high frequency heating apparatus stops its operation, the heating control section 41 serves to open the relay contacts 74 and 75 and close the relay contact 76 to operate a charging circuit or means 39. Then, the charging circuit 39 charges the battery 37 so that it is automatically charged again with the electric energy discharged during the previous heating operation. The charging circuit 39 is a voltage dropping type DC—DC converter which converts the DC voltage obtained by a diode 77 and a capacitor 78 into the voltage suitable to charge the battery 37 by a transistor 79, diodes 80, 81, an inductor 82, a capacitor 83 and a control circuit 84. The charging circuit 39 can optionally adjust its output voltage in accordance with the ON/OFF ratio of the transistor 79. The details of its operation will not explained here since they are well known.

The above arrangement permits current supply from the commercial power source 31 to the charging circuit 39 to become zero while the power converting section 33 operates Thus, it can power-convert the maximum power which can be supplied from the commercial power source 31 thereby to provide a desired large radio wave output.

Figure 7:
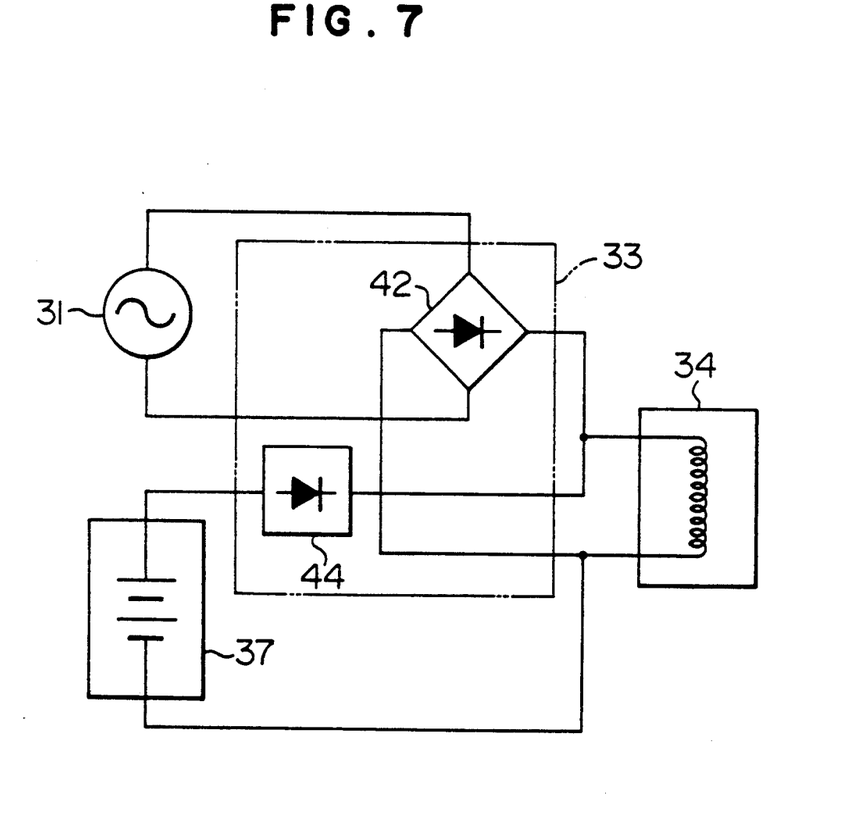
FIG. 7 is a circuit diagram of the electric oven (cooking apparatus) according to still another embodiment of the present invention.

FIG. 7 shows a circuit configuration of the electric oven according to still another embodiment of the present invention. In FIG. 7, like reference numerals designate like elements in FIGS. 1 and 2.

In FIG. 7, in response to the current supplied from a commercial power source 31, a rectifying means 42 which is a diode bridge supplies its full-wave rectified output to a heater 34 for radiating thermal energy to a heating chamber A battery 37 also supplies electric power to the heater 34 through a current back-flow preventing means 44 which is a diode. Specifically, the power converting section 33 comprises the rectifying means 42 of the diode bridge which converts the power from the commercial power source (external power source) 31 into uni-directional power to be supplied to the heater 34. Hence, the power from the battery 37 and the power from the commercial power source 31 can be easily summed.

Figure 8:
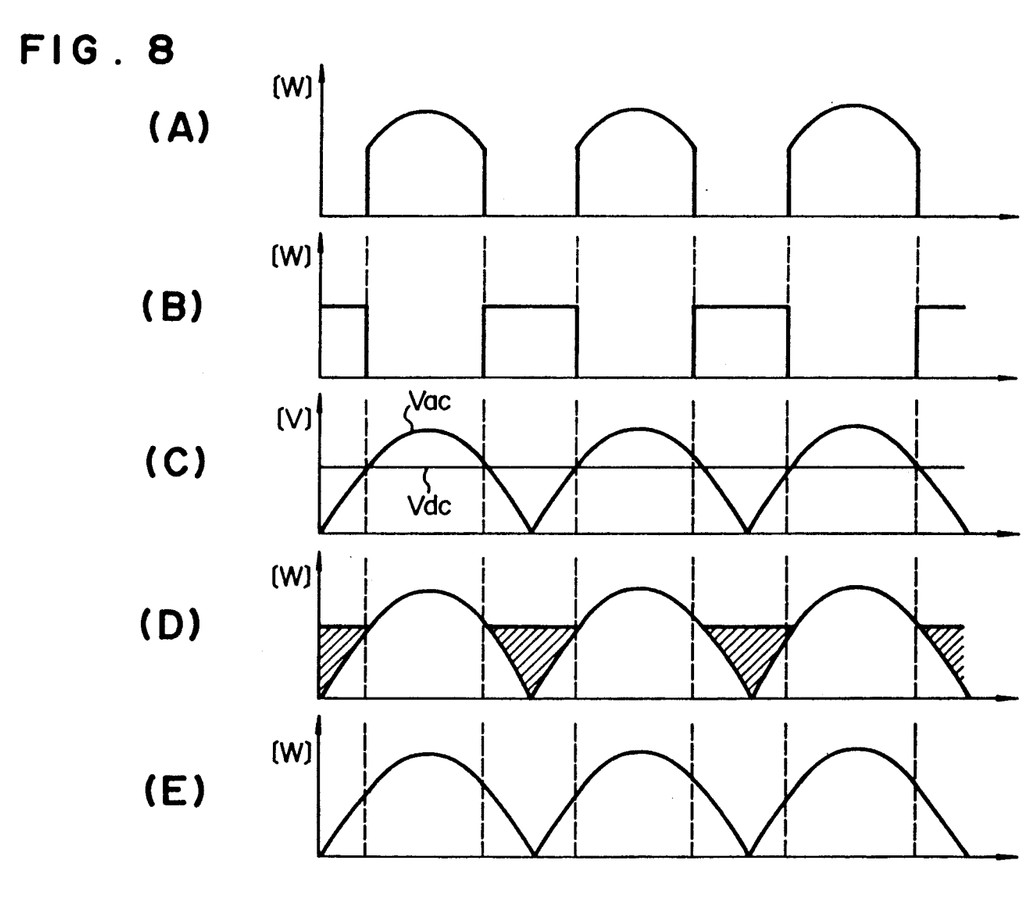
FIG. 8 shows a waveform diagram wherein (A) shows a diagram of the output power from the diode bridge (rectifying means) in FIG. 7, (B) shows a diagram of the output power from the back-current-flow preventing means in FIG. 7, (C) shows a relationship between the output voltages in FIG. 7, (D) shows a diagram of the entire power supplied to the heater in FIG. 7, and (E) shows a diagram of the power supplied only from the external power source to the heater in FIG. 7.

FIGS. 8(A) and (B) show waveforms of electric power supplied to the heater 34 through the rectifying means 42 and the current back-flow preventing means 44, respectively. In FIG. 8, (C) shows the relationship between the voltage waveform Vac of the above full-wave rectifying output and the waveform Vdc of the output voltage from the current back-flow preventing means 44. In FIG. 8, (D) shows the waveform of the entire power supplied to the heater 34. In FIG. 8(E) shows the waveform of the power supplied to the heater 34 when the power is supplied from only the commercial power source 31.

Specifically, during the period when the output voltage from the rectifying means 42 is not lower than that from the current back-flow preventing means 44, the power as shown in FIG. 8(A), i.e., the power from the commercial power source 31 is supplied to the heater 34. On the other hand, during the period when the former is lower than the latter, the power as shown in FIG. 8(B), i.e., the power from the battery 37 is supplied to the heater 34. Thus, without increasing a burden for the commercial power source 31, the power which is more by the shaded portion in FIG. 8(D) than in the case where power is supplied from only the commercial power source. For example, assuming that the power from the commercial power source 31 is about 1200 W and the output voltage from the current back-flow preventing means 44 is 105 V, the power of about 800 W will be supplied from the battery 37. As a result, the total power of about 2000 W will be supplied to the heater 34. The heating output or energy corresponding to 2000 W can be radiated to the heating chamber. Incidentally, the current back-flow preventing means 44 serves to prevent the output from the rectifying means 42 from flowing into the battery 37.

Figure 9:
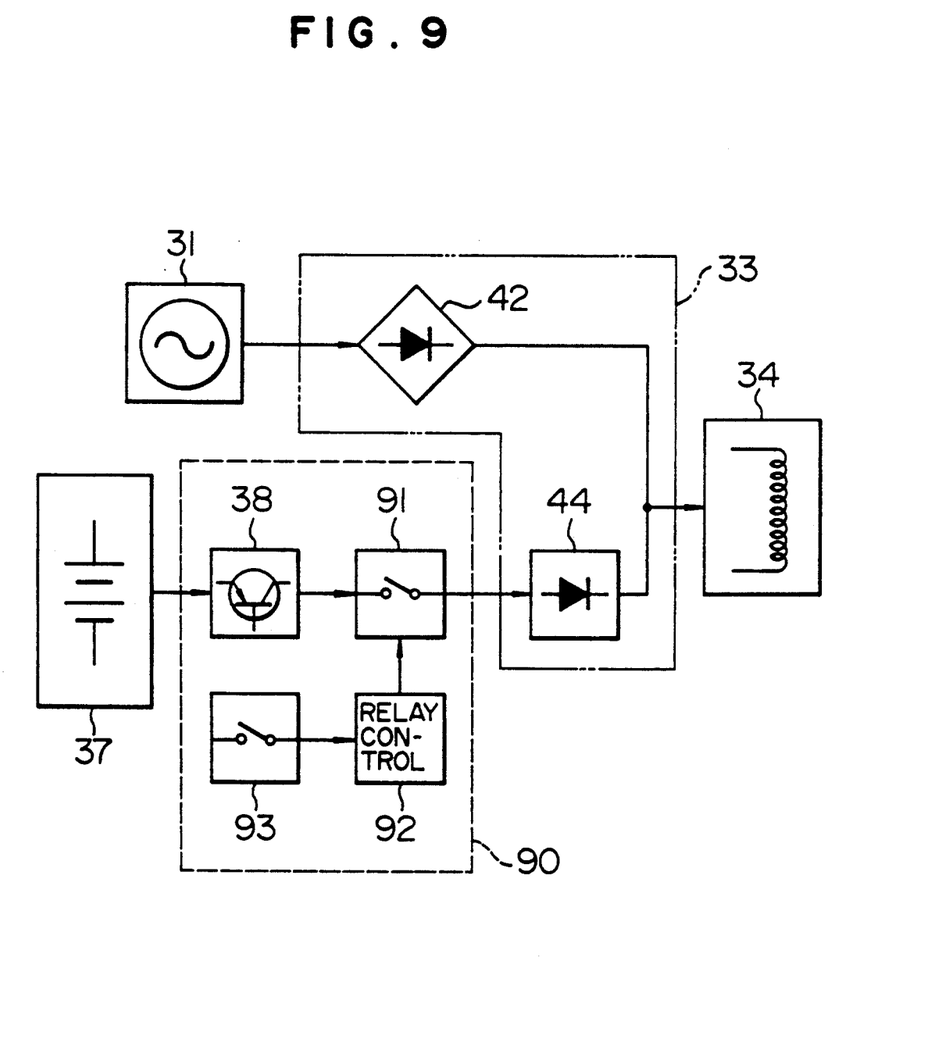
FIG. 9 is a circuit diagram of the electric oven according to a further embodiment of the present invention.

FIG. 9 shows a circuit configuration of the electric oven according to a further embodiment of the present invention. In FIG. 9, like reference numerals designate like elements in FIGS. 2 and 7. As seen from FIG. 7, in response to the power supplied from a commercial power source (external power source) 31, a rectifying means 42 supplies its full-wave rectified output to a heater 34 for radiating thermal energy to a heating chamber. A battery 37 also supplies electric power to the heater 34 through a battery output control means 90 and a current back-flow preventing means 44 which is a diode. The battery output control means 90 comprises a voltage boosting means 38 of a DC—DC converting means 38, a relay 91, relay control unit 92 and a switch 93. The battery output control means 90 boosts the input voltage supplied from the battery 37 by the voltage boosting means 38 and supplies the boosted output to the current back-flow preventing means 44 through the relay 91. The relay control unit 92, when a signal comes from a switch 93 and for a predetermined period from start of the operation of the electric oven, e g. for three minutes, controls closing/opening the relay 91 to adjust the power to be supplied to the current back-flow preventing means 44. Incidentally, the current back-flow preventing means 44 serves to prevent the output from the rectifying means 42 from flowing into the battery 37. The details of the DC—DC converter is not explained here since they are well known. The above arrangement can realize an electric oven which can use a low voltage of 45 V or less from the battery 37 in a manner of boosting it by the voltage boosting means, assure great safety and radiate high heating energy from the heater 34 to a heating chamber.

Figure 10:
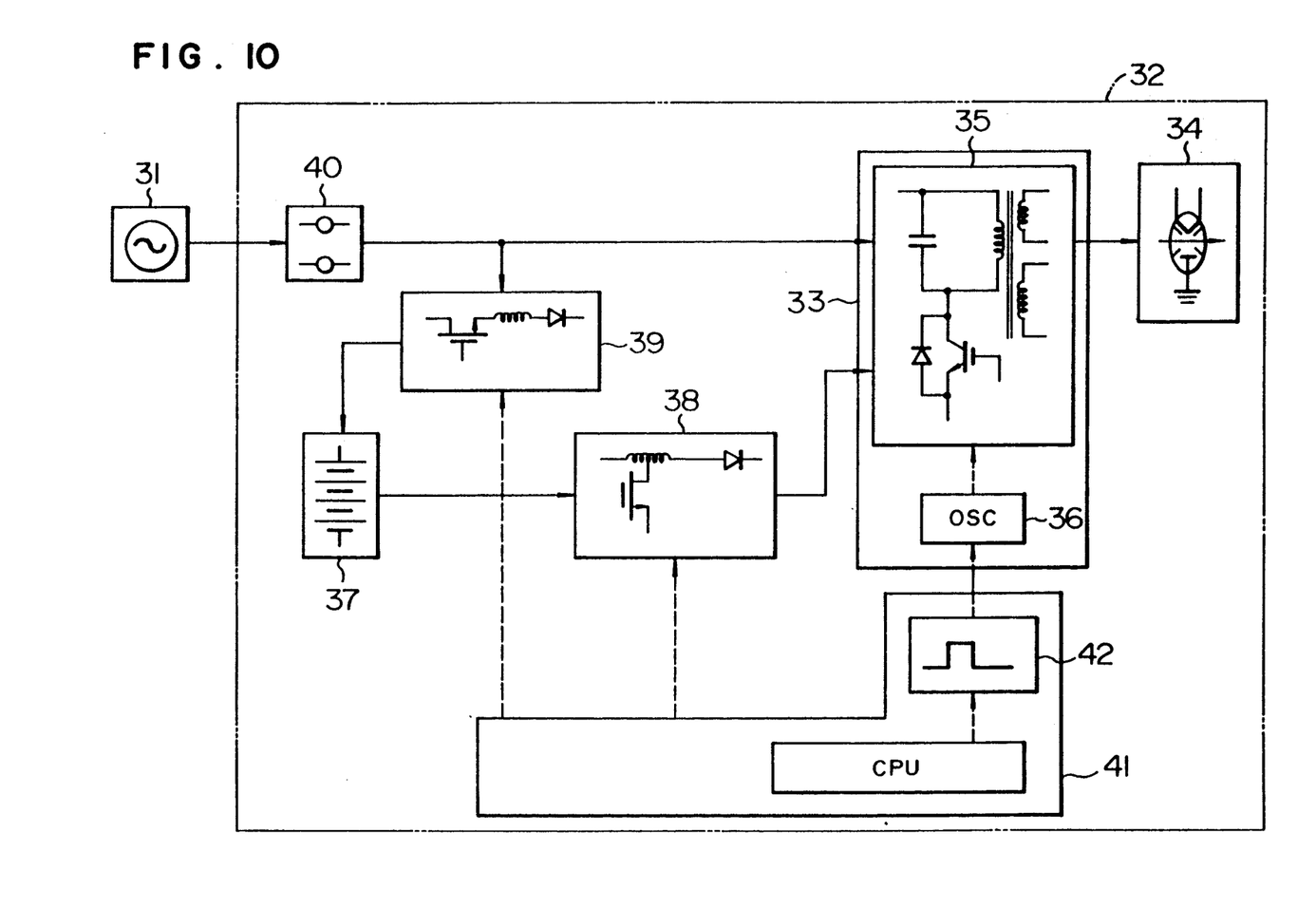
FIG. 10 is a circuit diagram of the high frequency heating apparatus according to a further embodiment of the present invention.

FIG. 10 shows the high frequency heating apparatus according to a further embodiment of the present invention. In FIG. 10, like reference numerals designate like elements in FIG. 1. In FIG. 10, a heating control section 41 comprises a short-time high output control unit 42 which controls the converter control unit 36 of a power converter section 33 so as to make the converted power from the power converter section 33 larger than the maximum permissible power in a continuous operation for a predetermined short time (e.g., one to five minutes) in accordance with an operation command from an operation unit (not shown) or a cooking command based on it.

In this case, in a manner of controlling e.g., the voltage boosting unit 38, the heating control section 41 serves to supply the power from the battery 37 as well as the power from external power source to the power converter section 33. Thus, while the input current from the external power source 31 is maintained at a predetermined level (e.g., 14 A), a desired predetermined high power is supplied to the power converter section 33 so that the radio wave radiated from the radio wave radiating unit 34 is very strong. For example, assuming that the external power source is a commercial 100 V power source and the input current is 12 A to 13 A, the prior art can only supply low power of about 1.2 kW to 1.3 kW to the power converter section 33 so that the radio wave output is as low as 600 W or so. On the other hand, the high frequency heating apparatus can supply the power from the battery 37 as well as the power from the external power source 31 to the power converter section 33. Thus, if the external power source 31 and the battery 37 produce amounts of power of 1.3 kW and 0.7 kW, the power converting section 33 power-converts a total of 2.0 kW. As a result, the radio wave radiating unit 34 can generate a high power output of 1000 W.

In this way, the arrangement of FIG. 10 can realize a high frequency heating apparatus which can enhance its high-speed heating (cooking) performance to twice or more as large as that of the prior art without increasing the input current from the external power source 31. In addition, the short-time high output control unit 42 performs such a high radio wave output control during only a predetermined heating time (e.g., three minutes) on the basis of an optional command in the heating control section 41, the cooling mechanism of the high frequency heating apparatus 32 does not necessitate assuring such a high output (1000 W) as the rated output in a continuous operation. This is because although heat generation due to power loss becomes great, because of its short time, the temperature of each of the components will not exceed that at rated output. As a result, each of the components such as the high voltage transformer and the power semiconductor is not required to have an excessively high heat-resistance performance so that the high frequency heating apparatus capable of producing a high radio wave output can be accomplished very economically.

Figure 11:
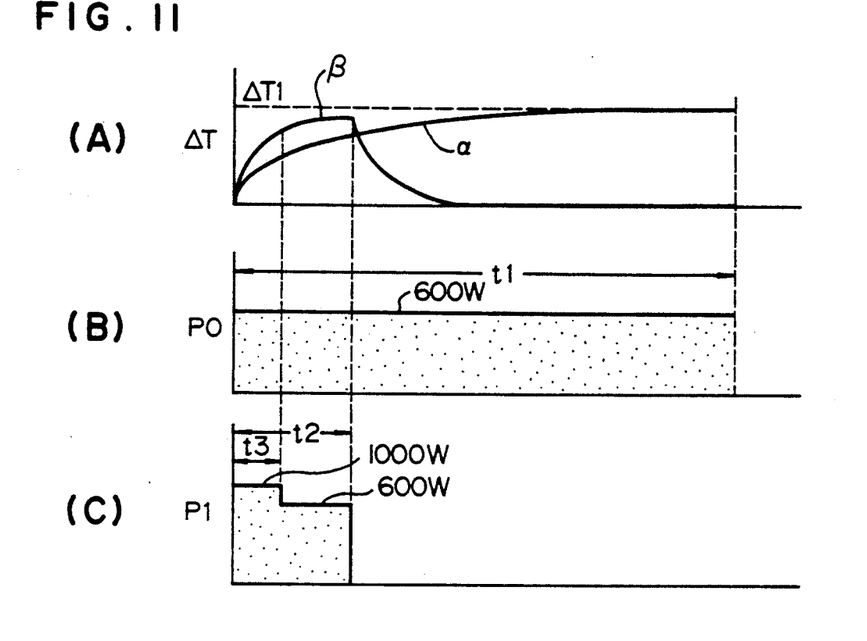
FIG. 11 shows graphs wherein (A) shows a graph for comparing the temperature increase characteristics in the apparatus of FIG. 10 and the prior art, (B) shows a graph showing the output characteristic of the prior art high frequency heating apparatus, and (C) shows a graph showing the output characteristic of the apparatus in FIG. 10.

In FIG. 11, (A) to (C) serve to explain the manner of the short-time high output control. FIG. 11(A) shows a temperature increase $\Delta T$ of the heat-generating components; FIG. 11(B) shows the radio wave output $P_0$ in the prior art high frequency heating apparatus; and FIG. 11(C) shows the radio wave output $P_1$ in the high frequency heating apparatus according to this embodiment.

A curve $\alpha$ in FIG. 11(A) is a temperature increase curve corresponding to the rated radio wave output $P_0$ in the prior art. This curve results in the temperature increase of $\Delta T1$ when the heating operation continues for a t1 time at the rated output $P_0$. Such an output $P_0$ given by the power current section 33 is stationary power during the continuous operation. Hence, in the prior art, in order to assure the temperature increase $\Delta T$ under the stationary power during the continuous operation, the cooling mechanism of the high frequency heating apparatus and the heat-resistant performance of each heat-generating component have been determined. Now if the high frequency heating apparatus according to this embodiment adopts an technical idea of the continuous operation, it necessarily becomes bulky and expensive for the purpose of realizing a suitable cooling mechanism and heat-resistant performance. However, in an actual cooking, most cooking requires only a short cooking time. Most cooking using the high frequency heating apparatus with an radio wave output of 500 W require only one to three minutes. Hence, this embodiment, which provides a radio wave output of 1000 W, only requires half time of the above time. In view of this, this embodiment proposes the short-time high output control unit 42. FIG. 11(C) shows the control manner by the control unit 42. Specifically, the control unit 42 controls the radio wave output $P_1$ to 1000 W for an optional time t3; if the cooking time is t2 exceeding t3, the control unit 42 controls the radio output $P_1$ so as to lower from 1000 W to 600 W. Such a radio wave control provide the temperature curve of curve $\beta$ in FIG. 11(A). The arrangement according to this embodiment, without requiring excessively excellent heat-resistant performance and cooling mechanism, permits most cooking to be made with a high radio wave output of 1000 W which could not be entirely adopted by the prior art, and thus provides a very excellent high speed cooking performance. Incidentally, although this embodiment was directed to short-time high output control when the apparatus starts to operate, the present invention should not be limited to this manner. The short-time high output control may be performed at any time on the way of cooking.

As understood from the description hitherto made, the cooking apparatus according to the present invention provides the following advantages.

(1) In an arrangement of the present invention, the amount of power from an external power source and the amount of power from a battery are summed to be converted by a single power converting section and the converted power is supplied to a heating energy radiating unit. This arrangement provides a cooking apparatus which can use the external power source to its maximum degree of power while obviating inconveniences such as reduction in the power factor of the external power source and an unstable phenomenon due to impedance mis-matching, power-convert the sum of amounts of power from the external power source and the battery with high impedance matching so that very great energy is generated from the heating energy radiating unit to heat the object to be heated. This realizes a cooking apparatus which can perform high speed cooking with great energy not limited by the current capacity of the external power source and so is suited to modern food life.

(2) In another arrangement of the present invention, the sum of amounts of power from an external power source and a battery is converted by a single power converting section and the converted power is supplied to a radio wave radiating unit. This arrangement provides a cooking apparatus which can easily power-convert the sum of amounts of power from the external power and the battery with high impedance matching, provides a very high radio wave output which the prior art could not provide, and so is more suitable to modern food life requiring higher speed cooking.

(3) In still another arrangement of the present invention, the power from an external power source is power-converted by a rectifying means and the output from a battery is also supplied to the rectifying means. This arrangement provides a cooking apparatus which can easily provide the sum of amounts of power and so realize the cooking at a very high speed in a simple structure.

(4) In yet another arrangement of the present invention, the external power source and the battery are connected in parallel to give the sum of amounts of power thereof. This arrangement provides a cooking apparatus which can provide the power sum with high impedance matching in a very simple structure.

(5) In a further embodiment of the present invention, power is supplied from a battery at a predetermined voltage which is lower than the instantaneous maximum voltage of an external AC power source. This arrangement provides a cooking apparatus which can realize the cooking with great heating energy without providing inconveniences such as reduction in the power factor of the external power source.

(6) In a further arrangement of the present invention, the voltage from a battery with the rated voltage of 45 V or less is boosted by a voltage boosting means thereby to constitute a power sum with an external power source. This arrangement provides a cooking apparatus which can assure high safety and reliability and provide a great heating energy output.

(7) In a further arrangement of the present invention, a charging means is provided to charge a battery and the battery is charged using the power from an external power source. This arrangement provides a cooking apparatus which can charge the battery safely and surely using the power from the external power source and supply the sum of amounts of power from the battery and the external power source to a power converting section with high impedance matching and for a long time by way of repeated charging/discharging. This arrangement therefore provides a cooking apparatus which provides a large radio wave output for a long time which the prior art could not provide and so is more suitable to modern food life requiring high speed cooking.

(8) In a further arrangement of the present invention, a current back-flow preventing means for preventing the current from the external power source from flowing into the battery. This arrangement provides a cooking apparatus which can supply power with high impedance matching between the external power source and the battery and in a stabilized manner and assure the high safety and long life of the battery.

(9) In a further arrangement of the present invention, the battery is charged using the power from the external power source when the power converting section stops its operation This arrangement provides a cooking apparatus which can always supply power from the external power source with its maximum degree to the power converting section while it operates so that the discharging capability is limited to an indispensable degree, and so provide an high radio-wave output which the prior art could not provide. This arrangement also provides a cooking apparatus which can previously charge the battery while it is not operated or used to use the power from the battery in a fully charged state, and always display the great heating capability suited to modern food life requiring higher speed cooking.

(10) In a further arrangement of the present invention, an AC power source is adopted as the external power source, a smoothing capacitor is provided to smooth the output from the voltage boosting section and the smoothing capacitor is given an electrostatic capacitance providing a sufficiently longer discharging time constant than the period of the AC power source. This arrangement provides a cooking apparatus which can output a desired DC output voltage in such a way that the voltage boosting section always makes an average, reasonable and indispensable voltage-boosting action and provide the power sum of the output voltage and the AC power source with high impedance matching. This arrangement, therefore, a cooking apparatus which can boost the output from the battery with a low rated voltage by the voltage boosting section fabricated at low cost in a simple and compact structure, and easily supply the sum of amounts of power of the boosted voltage and the external power source to the power converting section with high impedance matching.

(11) In a further arrangement of the present invention, the sum of amounts of power from the external power source and the battery is converted by the power converting section and the great energy thus obtained is radiated to an object to be heated for a predetermined time provides a cooking apparatus which can provide a large heating output due to the sum of amounts of power from the battery having a relatively small size and light weight and the external power source. Thus, this arrangements provides a cooking apparatus having the features of great heating energy, compact size, light weight and low cost. Particularly, the arrangement that the great heating energy due to the summed power is provided for a predetermined time after the cooking apparatus starts to operate provides a cooking apparatus which can provide a large heating output although it is more compact and light.

We claim:
1. An electric cooking apparatus comprising:
a single power converter section, for connection at an input thereof to an external AC power source, for converting power supplied from the external AC power source;
a heating-energy radiator section, coupled to an output of the power converter section, for receiving the converted power from the power converter section and radiating heating energy to a heating chamber; and
a battery for supplying power to the power converter section; and
coupling means for coupling the battery o an input of the power converter section, wherein a sum of the power from the external AC power source and the battery is converted by the power converting section when an instantaneous voltage of the external AC power source is smaller than a predetermined voltage level, which predetermined voltage level is smaller than a maximum instantaneous voltage of the external AC power source.

2. An electric cooking apparatus according to claim 1, wherein:
the heating-energy radiator section comprises radio wave radiating means,
the power converter section comprises a single inverter circuit having at least one semiconductor device, and
the sum of power from the external AC power source and the power from the battery is power-converted by the inverter circuit and supplied to said heating energy radiator section.

3. An electric cooking apparatus according to claim 1, wherein:
said power converter section comprises rectifier means for rectifying power from the external AC power source into a uni-directional power, and
power from the battery is supplied to the rectifier means, the rectifier means thereby providing a sum of the power from the external AC power source and the battery.

4. An electric cooking apparatus according to claim 1, wherein:
said external AC power source and said battery are connected to form a parallel circuit, and
output from the parallel circuit is supplied to said power converter section.

5. An electric cooking apparatus according to claim 1, wherein said battery is a battery providing an output of 45 V or less, further comprising voltage boosting means, coupled between the battery and the power converter section, for boosting the voltage from the battery, wherein the sum of power from the voltage boosting means and the external AC power source is supplied to said power converter section.

6. An electric cooking apparatus according to claim 1, further comprising a smoothing capacitor for smoothing said voltage boosting means output, said capacitor having an electrostatic capacitance providing a longer discharging time constant than a period of said external AC power source.

7. An electric cooling apparatus according to claim 1, wherein said coupling means comprises current backflow preventing means for preventing a current from flowing from said external AC power source into said battery.

8. An electric cooking apparatus according to claim 1, further comprising charging means for charging the battery using power supplied from the external AC power source.

9. An electric cooking apparatus according to claim 8, wherein said battery is charged using power supplied from said external power source while said apparatus is not operating.

10. An electric cooking apparatus comprising:
a single power converter section, for connection at an input thereof to an external AC power source, for converting power supplied from the external AC power source;
a heating-energy radiator section, coupled to an output of the power converter section, for receiving converted power from the power converter section and radiating heating energy to a heating chamber; and
a battery for supplying power to said power converting section;
coupling means for coupling the battery to an input of the power converter section; and
a short-time high-output control section, coupled to the power converter section, for controlling the power converter section so that converted power is larger than a stationary maximum value of a continuously operable power for a predetermined time,
wherein a sum of the power from the external AC power source and the battery is converted by the power converting section when an instantaneous voltage of the external AC power source is smaller than a predetermined voltage level, which predetermined voltage level is smaller than a maximum instantaneous voltage of the external AC power source, and
wherein heating energy is larger than the stationary maximum value of a continuously operable energy.

11. An electric cooking apparatus according to claim 10, wherein said short-time high-output control section controls the power converter section so that for a predetermined time after the apparatus starts to operate, converted power is larger than the stationary maximum value of a continuously operable power for a predetermined time, and so that heating energy, when the apparatus starts to operate, is larger than the stationary maximum value of a continuously operable energy.

* * * * *